United States Patent
Ylonen

(10) Patent No.: US 8,550,404 B2
(45) Date of Patent: Oct. 8, 2013

(54) ELECTRIC SAIL WITH VOLTAGE MULTIPLIERS IN TETHERS

(75) Inventor: Tatu J. Ylonen, Espoo (FI)

(73) Assignee: Clausal Computing Oy (FI)

( * ) Notice: Subject to any disclaimer, the term of this patent is extended or adjusted under 35 U.S.C. 154(b) by 70 days.

(21) Appl. No.: 12/915,282

(22) Filed: Oct. 29, 2010

(65) Prior Publication Data

US 2012/0104176 A1    May 3, 2012

(51) Int. Cl.
*B64G 1/00* (2006.01)

(52) U.S. Cl.
USPC ...................................... 244/158.2

(58) Field of Classification Search
USPC ................... 244/158.2, 168, 171.1, 171.5
See application file for complete search history.

(56) References Cited

U.S. PATENT DOCUMENTS

| | | | | |
|---|---|---|---|---|
| 5,703,770 A * | 12/1997 | Burtin et al. | ..................... | 363/61 |
| 6,942,186 B1 * | 9/2005 | Levin et al. | ................ | 244/158.2 |
| 7,641,151 B2 * | 1/2010 | Janhunen | ................... | 244/158.2 |
| 2007/0205331 A1 | 9/2007 | Janhunen | | |
| 2012/0049533 A1 * | 3/2012 | Kelly | .............................. | 290/55 |

OTHER PUBLICATIONS

P. Janhunen: Electric Sail for Spacecraft Propulsion, AIAA Journal of Propulsion and Power, 20(4), Jul.-Aug. 2004.
P. Janhunen & A. Sandroos: Simulation study of solar wind push on a charged wire: basis of solar wind electric sail propulsion, Annales Geophysicae, 25, pp. 755-767, 2007.
P. Janhunen: On the feasibility of a negative polarity electric sail, Annales Geophysicae, 27, pp. 1439-1447, 2009.
P. Janhunen: Electric Sail Technology Status Review, presentation slides from the First Workshop on Electric Sailing held at ESA ESTEC on Monday, May 19, 2008.

\* cited by examiner

*Primary Examiner* — Valentina Xavier

(57) ABSTRACT

The effective area of an electric sail depends on the voltage applied to tethers. The use of higher voltages is made possible by moving voltage multipliers to tethers, perhaps 100 meters out from the body of the spacecraft.

5 Claims, 3 Drawing Sheets

ELECTRIC SAIL WITH VOLTAGE MULTIPLIERS IN TETHERS

CROSS-REFERENCE TO RELATED APPLICATIONS

Not Applicable

INCORPORATION-BY-REFERENCE OF MATERIAL SUBMITTED ON ATTACHED MEDIA

Not Applicable

TECHNICAL FIELD

The invention relates to spacecraft propulsion, and particularly to using the solar wind for propulsion using an electric sail.

BACKGROUND OF THE INVENTION

Electric sails are a promising propulsion method for relatively low-cost and high-performance spacecraft within the solar system. They are similar to solar sails, but use solar wind as a source of thrust.

In known designs the electric sail consists of tethers arranged radially from a central, rotating hub, or of some kind of network of wires, tethers, or similar narrow structures covering a relatively large area. Solar sail designs frequently use thin foil.

For further information on the state of the art in electric sails, see the US patent application 2007/0205331 A1 (P. Janhunen: Electric Sail for Producing Spacecraft Propulsion); P. Janhunen: Electric Sail for Spacecraft Propulsion, AIAA Journal of Propulsion and Power, 20(4), 2004; P. Janhunen & A. Sandroos: Simulation study of solar wind push on a charged wire: basis of solar wind electric sail propulsion, Annales Geophysicae, 25, pp. 755-767, 2007; and P. Janhunen: On the feasibility of a negative polarity electric sail, Annales Geophysicae, 27, pp. 1439-1447, 2009; and the presentation by P. Janhunen on the state of the art in electric sails presented at the First Workshop on Electric Sailing held at ESA ESTEC on Monday, May 19, 2008. The above references are hereby incorporated herein by reference.

The efficiency of an electric sail is proportional to the effective area of the sail, which in turn depends on the voltage in the tethers. However, increasing the voltage of the tethers is difficult, because near the hub the tethers are relatively close to each other, and controlling very high voltages and voltage differentials becomes difficult, especially in confined spaces within a spacecraft.

It is an objective of the present invention to make use of much higher tether voltages possible, therefore increasing the effective area of the sail without necessarily increasing its physical dimensions.

BRIEF SUMMARY OF THE INVENTION

The idea is to move high voltage generation for the tethers out to the tethers, possibly tens of meters or more out from the body of the spacecraft, such that risk of sparks, arcs, or significant ion flows is reduced, and voltages used for controlling the sail are kept relatively low (preferably low enough to be switched using semiconductors or small, light-weight relays).

A first aspect of the invention is a tether for use in an electric sail powered spacecraft, comprising:
 a low-voltage tether electrically connected to the low-voltage end of a voltage multiplier and the output of a control voltage generator;
 a high-voltage tether, whose length is at least one kilometer, electrically connected to the high-voltage end of the voltage multiplier; and
 a load-bearing insulating member carrying load from the high voltage tether to the support structure of the spacecraft.

A second aspect of the invention is a method of generating a high voltage for a tether in an electric sail powered spacecraft, comprising:
 generating a control voltage;
 driving a voltage multiplier from the control voltage via a low-voltage tether;
 driving one or more high-voltage tethers from the output of the voltage multiplier, the high-voltage tethers being at least one kilometer long; and
 using a load-bearing insulating member to carry load from the high-voltage tether to the support structure of the spacecraft.

A third aspect of the invention is an electric sail powered spacecraft comprising:
 a plurality of tethers, at least one tether comprising a load-bearing insulating member, a low-voltage tether, and a high voltage tether, with the length of the high-voltage tether being at least one kilometer; and
 a control voltage generator electrically connected via the low-voltage tether to the low-voltage end of a voltage multiplier whose high-voltage end is electrically connected to the high-voltage tether.

BRIEF DESCRIPTION OF THE SEVERAL VIEWS OF THE DRAWING(S)

Some embodiments of the invention are illustrated in the accompanied figures.

DETAILED DESCRIPTION OF THE INVENTION

Voltage multipliers for generating high voltages for tethers of an electric sail are moved out from the body of the spacecraft to locations where relatively high isolation distances are available between conducting components that are at high potential differentials. Such isolation makes possible much higher voltages at the tethers, which means higher charges, which means higher thrust obtained from the same area of the sail. Increasing the thrust reduces travel times, increases practical spacecraft loads, and allows the use of shorter tethers for the same thrust, therefore enabling new applications and bringing cost savings. Increasing the voltage may be a much more cost-efficient and lower-weight way of increasing thrust than increasing area. It is also likely to yield better tolerance against micrometeors than a larger sail with more tether area.

A further potential advantage of increasing tether voltage may be a reduction in the current flowing in the tether, which makes the conductivity of the tether material less critical, allowing other criteria to be given more weight in choosing tether material and structure. Yet another potential advantage is increasing the repulsion of tethers from each other, which may reduce their risk of entanglement.

Cost-effective electric sail powered transport within the solar system could be one of the enabling technologies for, e.g., establishing and supporting permanent colonies on the Moon or other planets and for enabling He-3 mining and transport from them.

In a rotating spacecraft with approximately 100 centrifugally stretched tethers, the tethers are relatively close to each other at the hub (the body of the spacecraft). Furthermore, the voltages of the tethers may need to be varied in order to control the spacecraft (proposed control solutions may, for example, adjust the voltages or lengths of the tethers).

If high voltages, for example, on the order of 1 MV (1 million Volts) were applied near the spacecraft, there would be high risks of sparks, arcs, electron or plasma flows, fires, electric shocks, etc. Therefore, it is desirable to keep the voltages (particularly relative voltages between parts) near the spacecraft reasonable (say, at a few kilovolts or at most a few tens of kilovolts).

Figure 1:
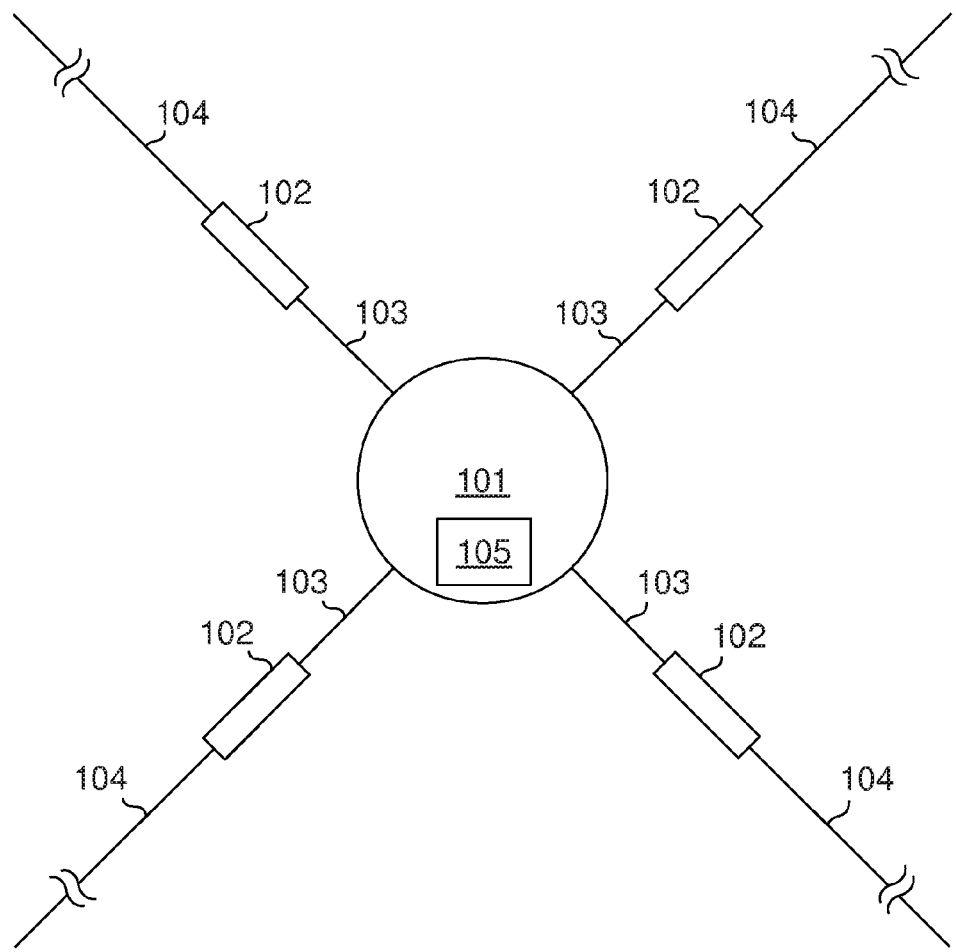
FIG. 1 illustrates an electric sail with voltage multipliers in tethers.

FIG. 1 illustrates a spacecraft with voltage multipliers in the middle of the tethers. 101 is the main body of the spacecraft (hub), which acts as a load-bearing support structure to which the tethers are attached. At least some tethers are preferably insulated from the support structure (or parts of the support structure are insulated from each other), so that the voltage of the tethers can be varied for controlling the flight of the spacecraft. 102 illustrate voltage multiplier assemblies, 103 illustrate low-voltage tethers between the hub and the voltage multipliers, and 104 illustrate the high-voltage ends of the tethers, which may be, e.g., 10 km long. 105 illustrates a control voltage generator.

The low-voltage tether may be made of a thicker, stronger material (e.g., 20-100 micrometer wires or fibers), and may comprise several wires. It can be constructed from, e.g., aluminum wires (one or more of which may be insulated and be used as the other polarity of the control voltage used to drive the voltage multiplier). Alternatively, e.g., carbon fiber, boron-aluminum composite, or other strong but light-weight material can be used to construct the tether. The tether advantageously comprises more than one load-bearing wire bonded together at regular intervals (e.g., using intersecting wires) to provide tolerance against micrometeor strikes which may break individual wires.

The high-voltage tether is preferably very long (e.g., 10 kilometers or more, or at least about 1 kilometer to produce reasonable thrust), thin (e.g., 5-20 micrometer wires), and light-weight, and sufficiently electrically conductive. It should preferably comprise several load-bearing electrically conductive wires (such as carbon fibers or thin aluminum wires) and regular bondings between such wires (such as intersecting wires bonded to the load-bearing wires) to provide tolerance against micrometeor strikes which may break individual wires. It may also be a combination of more than one material, such as carbon fiber for good tensile strength and aluminum wire for good electrical conductivity.

In an embodiment, the high-voltage tether comprises a plurality (e.g., 10 to 100) of very thin load-bearing fibers (such as single carbon fiber filaments) arranged approximately evenly along a circle, and connected together by one or more fibers spiraling around the other fibers and bonded to them, so that if one of the load-bearing fibers breaks, its load will be transmitted to the other fibers by the spiral fiber(s), thus providing redundancy against material imperfections and micrometeors. Such an arrangement of the wires may also help reduce the surface electric field on the wires (permitting higher voltage potentials without significant breakage of ions or other material from the wires), provides low effective radius for electron capture (reduces current in the tethers), and provides multiple redundant paths for the current (from captured electrons) to flow (the current is estimated to be about 1 mA at 20 kV and to grow with the square root of the voltage).

It is well known in the art how aluminum wires may be bonded. Bonded carbon fibers may be produced by producing the desired tether structure from a precursor polymer of carbon fiber, such as PAN (polyacrylonitrile), bonding the precursor fibers by partial oxidization (or other suitable method), and then carbonizing the bonded tether assembly. A more detailed description of the method can be found in Lipka et al: Lightweight Substrates for Nickel Electrodes, 14th IEEE Battery Conference on Applications and Advances, 1999.

The voltage in the low-voltage tether might be somewhere in the 1-10 kV range. The voltage in the high-voltage tether might be somewhere in the 20 kV-1 MV range or even more (generally the higher the voltage in the high-voltage tether the better; however, strength of tether surface field may become a limiting factor with very high voltages if ions and fragments start to break off from the wires, and as is known in the art, very high voltage multiplication ratios can be problematic when there is current flowing through the voltage multiplier).

Figure 2:
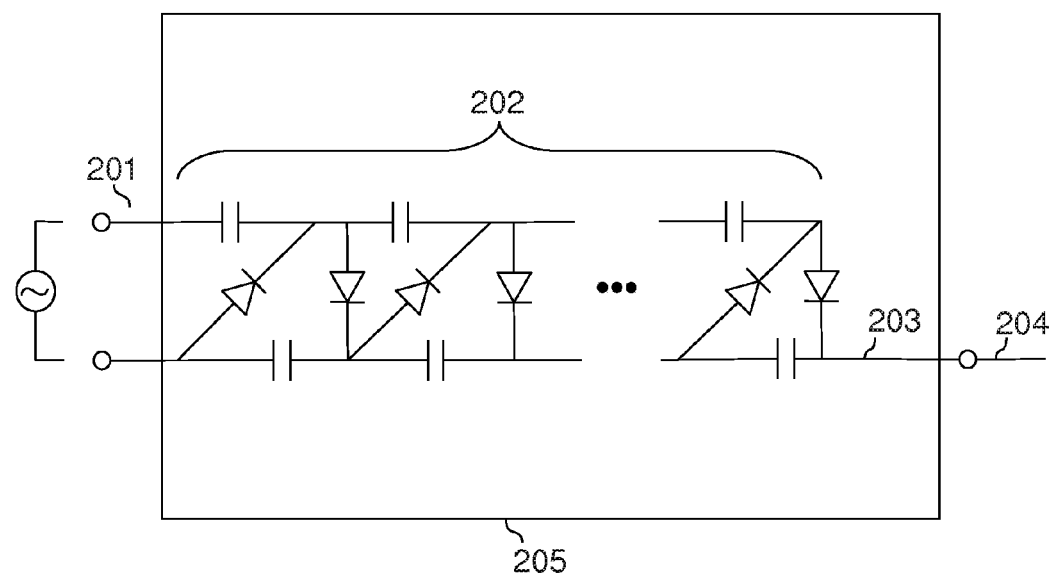
FIG. 2 illustrates a possible voltage multiplier configuration.

FIG. 2 illustrates a possible voltage converter assembly based on the Villard Cascade. 201 illustrates the low-voltage end (connected to a low-voltage tether 103, or to other cabling leading to a control voltage generator), 202 illustrates voltage multiplier stages, 203 illustrates the high-voltage end of the voltage multiplier, and 204 the high-voltage tether. 205 illustrates a light-weight load-bearing insulating member that carries the pull of the tether 204 to the low-voltage tether 103; it may be, e.g., a pipe made of any vacuum-compatible UV-tolerant insulating structural plastic or composite or other suitable light-weight insulating structural material, which are known in the art. The load-bearing insulating member should also provide micrometeor protection (e.g., by having thin outer layer slightly separated from it), and connections to both the low-voltage and the high-voltage tether should preferably be redundant (both mechanically and electrically).

Diodes used in the Villard Cascade could be, e.g., M160UFG diodes from Voltage Multipliers, Inc. (rated for 16 kV), and the capacitors could be, e.g., Panasonic ECKD4C102MDV (1 nF, 15 kV), or comparable components specially designed for the space environment (the voltage multipliers could be molded in an insulating protective material or pressurized if some components are not fully space-compatible). The control voltage source could generate, e.g., 5 kV or 10 kV sine wave, generated using a conventional oscillator (solar panel/battery DC voltage could be upscaled using a switching power supply, or the oscillator could run at a lower voltage with the output scaled up using a transformer, or both). The oscillator could run at, e.g., 100 kHz, though higher frequencies may be desirable or larger capacitors (or several capacitors in parallel) could be used alternatively (the required frequency and/or size of capacitors depends on the current, and thus on the voltage, the size of the sail, and the thickness of the (wires of) the high-voltage tether). With 20 multiplier stages the high-voltage tether could be powered at 100 to 200 kV. Still higher voltages could be generated by more advanced high voltage generation systems, similar to those used for driving high-voltage DC power lines (however designed for much smaller currents), and several semiconductor components (e.g., diodes, IGBTs, thyristors) could be used in series (and combined with specially designed high-voltage capacitors) to permit higher oscillator voltages.

Any suitable light-weight voltage multiplier known in the art may be used with the invention. Known voltage multiplier architectures include, but are not limited to the Villard Cascade, the Cockcroft-Walton generator, the Greinacher Voltage Doubler, the Marx generator, and transformers. In general, the term voltage multiplier herein means any circuit that can multiply an input (AC or DC) voltage to a much higher output DC voltage (regardless of polarity).

The low-voltage tether and high-voltage tether attachments to the voltage multiplier serve two purposes. An electrical connection is required to pass the voltages and currents (the electrical connection should be redundant, because micrometeors may sever individual wires, particularly very thin wires). A load-bearing connection is required to pass the centrifugal force of the high-voltage tether safely to the load-bearing insulating member, and further (preferably through the low-voltage tether) to the body of the spacecraft. The load-bearing connection can be easily achieved by molding the load-bearing insulating member such that the low-voltage and high-voltage tethers are partially embedded in it (as in a composite). If the low-voltage and high-voltage tethers have a mesh-like structure (as with bonded spiraling fibers described above), the mesh helps ensure solid bonding with the load-bearing insulating member.

In an embodiment, wire reels from which the high-voltage tethers are unwound are placed at the high-voltage end of the voltage multiplier assemblies. In an embodiment, there are one or more other wire reels for the low-voltage tethers, which are used to deploy the voltage multipliers to a distance on the order of 100 meters from the body of the spacecraft to achieve sufficient isolation distances.

In an embodiment, the oscillator is also placed in the tether, as part of the voltage multiplier. In this case, the low-voltage tether passes DC current (or low-frequency AC current used to power a small power supply associated with the oscillator). This may be more convenient from an RF interference perspective, and may permit higher frequencies to be used for the oscillator (thus permitting smaller capacitors to be used). With this arrangement, high-frequency AC current only occurs within the voltage multiplier (whose circuit layout could be designed to minimize RF emissions and at least parts of which could RF shielded).

Figure 3:
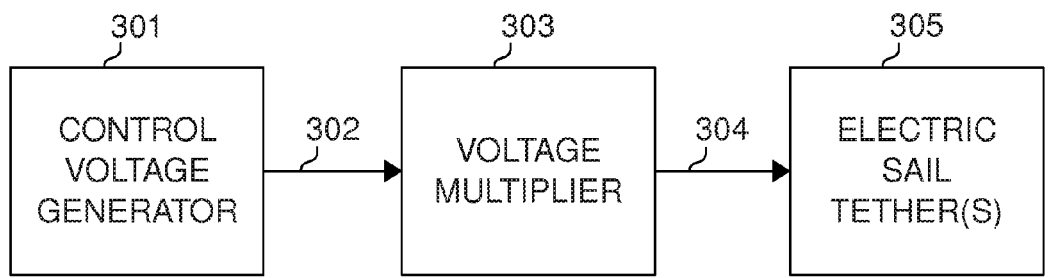
FIG. 3 illustrates a control voltage generator driving a voltage multiplier driving one or more electric sail tethers.

FIG. 3 illustrates a method of generating a high voltage in a tether in an electric sail. 301 illustrates a control voltage generator. The control voltage generator is preferably an alternating voltage source with an output voltage of a few kilovolts. The control voltage generator is here viewed from the perspective of a single tether; in reality it may be a single moderately high voltage generator and a plurality of switches (such as semiconductor switches, thermionic valves, or electromechanical relays), each connecting it to a tether (alternatively, multiple switches per tether could also be used for redundancy, and a single switch could drive more than one tether). In other words, the control voltage generator may be advantageously shared between several or all tethers. It is well known in the art how to build, e.g., sine wave generators with output voltages in the 1-10 kV range (e.g., using a lower voltage sine wave generator and a transformer).

The control voltage generator drives 302 a voltage multiplier 303. The voltage multiplier (particularly its high-voltage end) is separated from the control voltage generator by a suitable isolation distance to prevent sparking and other problems. They may be connected by the low-voltage tether 103.

The voltage multiplier drives 304 one or more high-voltage tethers (electric sail tethers 305).

A sufficient isolation distance between parts of the spacecraft is such that no sparking or significant ion/electron flow occurs between parts of the spacecraft that are at different potential. In a preferred embodiment the isolation distance is at least two meters, plus an additional safety provision of four meters between tethers to allow for tethers bending when the spacecraft is turning and for special events, such as ion bursts from micrometeor strikes. With 100 tethers, a total isolation distance of six meters implies placing the voltage multipliers at a distance of approximately 100 meters from the hub.

Many variations of the above described embodiments will be available to one skilled in the art. Different layouts of the sail could be used, the number of tethers could vary, the polarity of the tethers could be positive or negative, the spacecraft could rotate in either direction (and might have, e.g., a rotating ring to which the tethers are attached, allowing the hub to remain stationary or to rotate at a different speed), and various insulating members could be used instead of the low-voltage tethers to achieve sufficient insulation distance.

Instead of locating the voltage multipliers in tethers, it would also be possible to connect the high-voltage tethers to load-bearing insulating members that are more or less rigidly connected to the hub of the spacecraft, such that sufficient isolation distances are reached, and place the voltage multipliers in such load-bearing insulating members or in some other suitable locations in the spacecraft, connected to the high-voltage tethers by a suitable high-voltage cable (which acts as the low-voltage tether; such cables are known in the art). When measuring tethers, the lengths refer to their lengths when unwound (in launch state they may be wound on reels in very small space).

The low-voltage and high-voltage tethers may be any suitable electrically conductive elongated members; the intention is not to restrict their construction or material except as specified in the claims. The term tether alone is used the refer collectively to the assembly of wires/fibers and other components protruding a kilometer or more out from the body of the spacecraft, preferably stretched by a centrifugal force, and for a significant part of it being electrically charged (positively or negatively) in order to generate thrust from the solar wind.

Even though not shown, it is understood that the control voltage generator may also comprise an electric potential generator (such as an electron gun or ion gun) used to generate an electric potential, as is known in the art. The spacecraft may also comprise auxiliary propulsion systems adapted to cause at least the part of the spacecraft to which the tethers are attached to rotate around a rotational axis that is perpendicular to the radial directions of the tethers.

It is to be understood that the aspects and embodiments of the invention described in this specification may be used in any combination with each other. Several of the aspects and embodiments may be combined together to form a further embodiment of the invention, and not all features, elements, or characteristics of an embodiment necessarily appear in other embodiments. A method or apparatus which is an aspect of the invention may comprise any number of the embodiments or elements of the invention described in this specification. Separate references to "an embodiment" or "one embodiment" refer to particular embodiments or classes of embodiments (possibly different embodiments in each case), not necessarily all possible embodiments of the invention. The subject matter described herein is provided by way of illustration only and should not be construed as limiting.

What is claimed is:

1. A tether for use in an electric sail powered spacecraft, comprising:
    a low-voltage tether electrically connected to a low-voltage end of a voltage multiplier and an output of a control voltage generator;

a high-voltage tether, whose length is at least one kilometer, electrically connected to the high-voltage end of the voltage multiplier; and a load-bearing insulating member carrying load from the high voltage tether to the support structure of the spacecraft, wherein the voltage multiplier can be deployed outside the spacecraft at a sufficient isolation distance from other parts of the spacecraft and wherein the load-bearing insulating member carries the load to the support structure via the low-voltage tether.

2. The tether of claim 1, wherein the voltage multiplier is located inside the load-bearing insulating member.

3. The tether of claim 1, further comprising a reel attached to the load-bearing insulating member for deploying the high-voltage tether by unwinding it from the reel.

4. A method of generating a high voltage for a tether in an electric sail powered spacecraft, comprising:

generating a control voltage;

driving a voltage multiplier located outside the spacecraft at a sufficient isolation distance from other parts of the spacecraft from the control voltage via a low-voltage tether;

driving one or more high-voltage tethers from an output of the voltage multiplier, the one or more high-voltage tethers being at least one kilometer long; and using a load-bearing insulating member to carry load from the high-voltage tether to a support structure of the spacecraft, wherein the load is carried from the high-voltage tether to the support structure via the low-voltage tether.

5. An electric sail powered spacecraft comprising:

a plurality of tethers, at least one tether comprising a load-bearing insulating member, a low-voltage tether, and a high voltage tether, with the length of the high-voltage tether being at least one kilometer; and a control voltage generator electrically connected via the low-voltage tether to the low-voltage end of a voltage multiplier whose high-voltage end is electrically connected to the high-voltage tether, wherein the voltage multiplier can be deployed outside the spacecraft at a sufficient isolation distance from other parts of the spacecraft and wherein load is carried from the high voltage tether to the support structure via the low-voltage tether.

* * * * *